(12) United States Patent
Sugimoto et al.

(10) Patent No.: US 9,085,055 B2
(45) Date of Patent: Jul. 21, 2015

(54) NUT FEEDING SYSTEM

(71) Applicant: HONDA MOTOR CO., LTD., Tokyo (JP)

(72) Inventors: Tomohiro Sugimoto, Tochigi (JP); Ryo Nakajima, Tochigi (JP); Shinji Sawada, Tochigi (JP); Shinji Yonehana, Tochigi (JP); Koichi Matsumoto, Tochigi (JP); Hideari Kamachi, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 316 days.

(21) Appl. No.: 13/872,437

(22) Filed: Apr. 29, 2013

(65) Prior Publication Data

US 2013/0299510 A1   Nov. 14, 2013

(30) Foreign Application Priority Data

May 8, 2012 (JP) ................. 2012-106777

(51) Int. Cl.
| | |
|---|---|
| B23Q 7/10 | (2006.01) |
| B23P 19/00 | (2006.01) |
| B25B 23/04 | (2006.01) |
| B23P 19/10 | (2006.01) |
| B23P 19/12 | (2006.01) |
| B23P 19/06 | (2006.01) |
| B25B 23/10 | (2006.01) |
| B23P 19/04 | (2006.01) |
| B65G 47/14 | (2006.01) |

(52) U.S. Cl.
CPC ............. *B23P 19/002* (2013.01); *B23P 19/003* (2013.01); *B23P 19/007* (2013.01); *B23P 19/10* (2013.01); *B23P 19/105* (2013.01); *B23P 19/12* (2013.01); *B25B 23/04* (2013.01); *B23P 19/004* (2013.01); *B23P 19/041* (2013.01); *B23P 19/06* (2013.01); *B25B 23/10* (2013.01); *B65G 47/1478* (2013.01); *Y10T 29/53039* (2015.01); *Y10T 29/53087* (2015.01); *Y10T 29/53478* (2015.01)

(58) Field of Classification Search
CPC .... B23P 19/002; B23P 19/003; B23P 19/004; B23P 19/007; B23P 19/06; B23P 19/10; B23P 19/105; B23P 19/12; B23P 19/041; B25B 23/04; B25B 23/10; Y10T 29/53039; Y10T 29/53087; Y10T 29/53478
See application file for complete search history.

(56) References Cited

U.S. PATENT DOCUMENTS

| | | | | |
|---|---|---|---|---|
| 4,270,237 A | * | 6/1981 | Breeze et al. | 470/49 |
| 4,503,993 A | * | 3/1985 | Ginnow et al. | 221/10 |
| 5,577,633 A | * | 11/1996 | Jones | 221/1 |
| 6,264,063 B1 | * | 7/2001 | Turner et al. | 221/278 |
| 8,973,247 B2 | * | 3/2015 | Hain et al. | 29/525.06 |

FOREIGN PATENT DOCUMENTS

JP          2-34516          3/1990

* cited by examiner

*Primary Examiner* — Ryan J Walters
(74) *Attorney, Agent, or Firm* — Rankin, Hill & Clark LLP

(57) ABSTRACT

Provided is a nut feeding system for feeding a nut smoothly and efficiently without the occurrence of nut clogging or the like. A posture alignment device 2 of the nut feeding system 1 repeats an advance and retreat motion of an insert pin 19. After the insert pin 19 is inserted into a screw hole of the nut N, the nut N is raised and transferred from the posture alignment device 2 towards a supply placing unit 5.

4 Claims, 9 Drawing Sheets

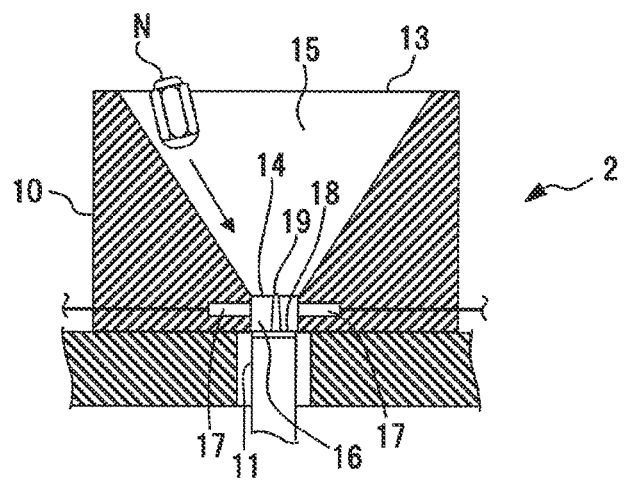
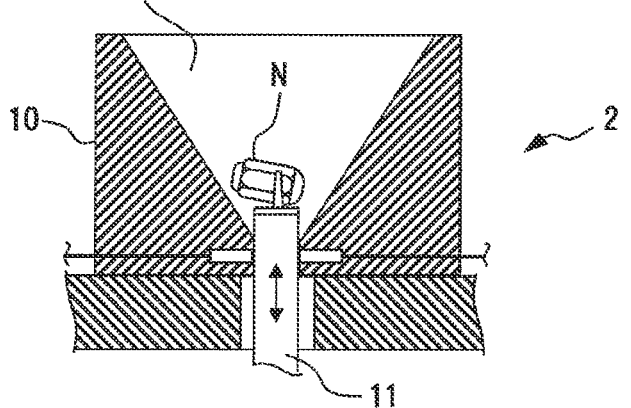
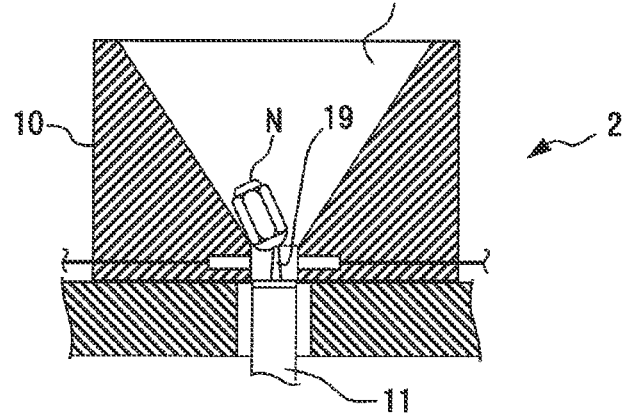

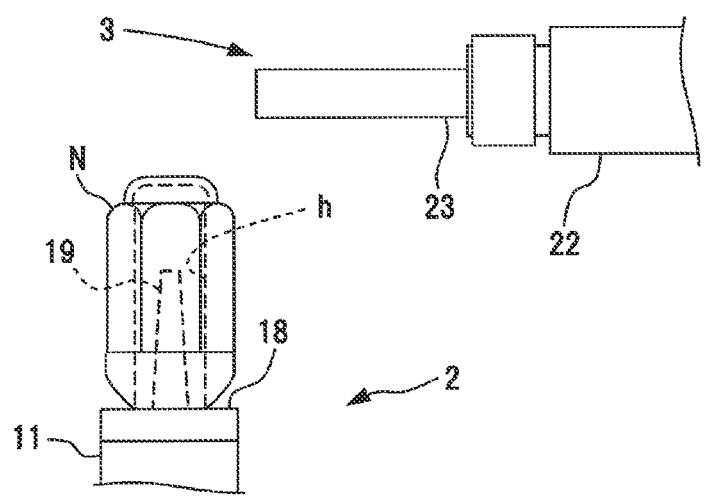
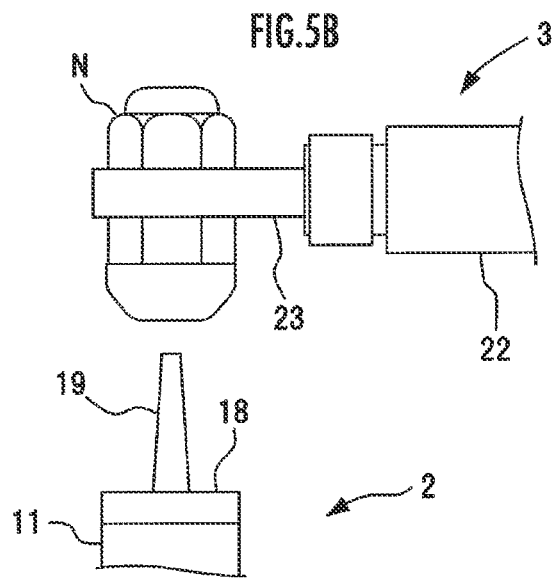

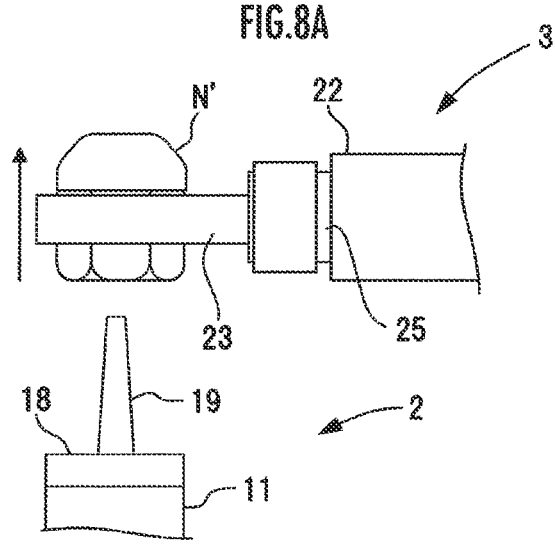
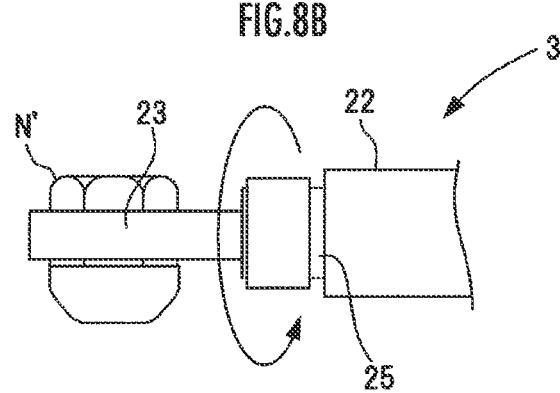

NUT FEEDING SYSTEM

BACKGROUND OF THE INVENTION

1. Field of the Invention

The present invention relates to a nut feeding system for feeding a nut to a predetermined feeding position.

2. Description of the Related Art

For example, a tire is attached to an axle by screwing a nut to a bolt provided at a hub of a vehicle at a tire attachment station in a manufacturing line of vehicles. The screw operation of the nut at the station is conducted by using a nut runner. Since one of the axis direction of the nut used here is defined as a predetermined fastening direction, it is necessary to set the nut to the nut runner aligned in the correct fastening direction.

There has been known a feeding apparatus of a nut for feeding the nut towards the proper fastening direction so as to smoothly conduct a setting operation of the nut to the nut runner (refer to Japanese Utility Model Laid-Open Publication No. H02-34516). This apparatus comprises a chute for aligning the orientation of axes directions of a plurality of nuts and feeding them, an alignment ring having a nut supply hole in an outer periphery which communicates with a terminal end portion of the chute to accommodate the nut, and a pushrod for pushing out the nut in the nut supply hole to the feeding direction along the axis line direction of the nut.

Then, the nut is pushed out from the nut supply hole by the pushrod after changing the posture of the nut by rotating the alignment ring so that the orientation of the axis line of the nut accommodated in the nut supply hole is directed to the predetermined fastening direction. By doing so, the nut can be supplied towards the appropriate fastening direction.

However, it is likely that the above conventional art is not able to perform smooth feeding to the nut supply hole due to occurrence of nut clogging in the chute when the nut fed in line along the chute is excessively inclined. It is also likely that the nut is not smoothly supplied due to occurrence of nut clogging inside the nut supply hole when the nut is inclined in an occasion of pushing out the nut inside the nut supply hole by the pushrod.

SUMMARY OF THE INVENTION

The present invention aims to provide a nut feeding system which is able to smoothly and efficiently supply a nut without occurrence of nut clogging or the like.

The present invention is a nut feeding system for feeding a nut to a predetermined feeding position comprising a posture alignment device configured to align the loaded nut to a posture in which an axis line of the nut is vertically directed, a supply placing unit provided at the feeding position and configured to place thereon the nut in the posture in which the axis line of the nut is vertically directed, and a transfer device configured to transfer the nut aligned to the posture by the posture alignment device towards the supply placing unit, wherein the posture alignment device comprises a sliding container unit having an inner circumferential face gradually decreasing a diameter from an upper end opening towards a lower end opening in which the nut loaded from the upper end opening slidingly drops to the lower end opening, a rod shaped advance-retreat member extending vertically and provided so as to freely advance and retreat from the lower end opening towards the upper end opening of the sliding container unit, an advance-retreat driving mechanism configured to drive the advance and retreat of the advance-retreat member, a nut mounting face formed at an upper end of the advance-retreat member and configured to be able to mount one end in an axial line direction of the nut, an insert pin arranged to stand on the nut mounting face and configured to insert in a screw hole of the nut on the nut mounting face and to maintain the mounting state of the nut in the posture in which the axis line of the nut is vertically directed on the nut mounting face, a nut detection sensor configured to detect the nut mounted on the nut mounting face with the insert pin inserted in the screw hole, and an alignment control unit configured to repeat the advance and retreat motion of the advance-retreat member by the advance-retreat driving mechanism until the nut detection sensor detects the nut, and to raise the nut on the nut mounting face higher than the upper end opening of the sliding container unit via the advance-retreat member by the advance-retreat driving mechanism when the nut detection sensor detects the nut, the transfer device comprises a nut retention mechanism configured to releasably retain the nut, and a transfer control unit configured to retain the nut on the nut mounting face by the nut retention mechanism, and to release the nut from the insert pin to transfer, when the nut is raised higher than the upper end opening of the sliding container unit by the advance-retreat member of the posture alignment device.

When the nut is loaded into the sliding container unit of the posture alignment device, the nut is guided by the inner circumferential face of the sliding container unit and slides down toward the lower end opening by a self weight. Inside the sliding container unit, the nut is pushed up by the advance-retreat member by repeating the advance and retreat of the advance-retreat member by the advance-retreat driving mechanism, and the posture of the nut constantly changes. Then, while the advance-retreat motion of the advance-retreat member is repeated, the insert pin at the upper end portion of the advance-retreat member is inserted to the screw hole of the nut. Along with this, the nut is mounted on the nut mounting face in a state of the insert pin being inserted in the screw hole. The nut mounted on the nut mounting face is in a state aligned to a posture in which the axis line of the nut is vertically directed, and is retained at the end portion of the advance-retreat member.

Then, when the nut retained at the end portion of the advance-retreat member is detected by the nut detection sensor, the alignment control unit of the posture alignment device elongates the advance-retreat member upward, thereby raises the nut on the nut mounting face higher than the upper end opening of the sliding container unit. When the nut is raised, the nut retention mechanism retains the nut and transfers the nut towards the supply placing unit by the control of the transfer control unit of the transfer device. Here, the transfer device transfers the nut while maintaining the posture of the nut on the nut mounting face by the nut retention mechanism, thereby enabling to place the nut on the supply placing unit in a posture in which the axis line of the nut is vertically directed.

As described above, according to the present invention, since it is able to feed the nut without passing through a conventional chute or the nut supply hole, nut clogging or the like does not occur, and enables to smoothly and efficiently supply the nut in a posture in which the axis line is vertically directed.

Moreover, in the present invention, it is preferable that the posture alignment device comprises a protrusion having a smaller height dimension than the insert pin at a position spaced from the insert pin on the nut mounting face.

According to this, when the advance-retreat member repeats the advance and retreat motion, the nut abuts the protrusion and the posture change of the nut is prompted. Therefore, it is able to insert the insert pin in the screw hole of the nut at an early stage.

Moreover, in the present invention, it is preferable to comprise a storage placing unit at a position different from the supply placing unit, configured to store a plurality of nuts placed in a posture in which the axes lines of the nuts are vertically directed, wherein the transfer device is configured to selectively retain by the nut retention mechanism and transfer toward the supply placing unit either one of the nut on the nut mounting face of the posture alignment device and the nut placed on the storage placing unit.

According to this, for example, the nut retention mechanism of the transfer device is able to retain the nut on the storage placing unit and transfer it to the supply placing unit while the advance and retreat of the advance-retreat member is repeated inside the sliding container unit in the posture alignment device. Therefore, the nut can be transferred to the supply placing unit without delay and the supply of the nut can be efficiently performed.

Moreover, in the present invention, the transfer device comprises an inversion mechanism configured to reverse an upside and downside of the nut via the nut retention mechanism in a case of transferring the nut in a posture in which the axis line of the nut is vertically directed, a fastening direction determining unit configured to determine whether or not the posture of the nut in which the axis line of the nut being vertically directed matches a predetermined fastening direction of the nut by detecting a shape of the nut raised higher than the upper end opening of the sliding container unit by the advance-retreat member, wherein the transfer control unit reverses the upside and the downside of the nut by the inversion mechanism when it is determined that the posture of the nut does not match the fastening direction by the fastening direction determining unit.

As a type of the nut, there is the so-called hexagon cap nut whose one end of the screw hole is blocked or a nut whose screw hole penetrates along the axis line. Moreover, even a nut whose screw hole penetrates, the shape of one end portion in the axis line direction and the shape of the other end portion may be different and such a nut has a predetermined fastening direction.

In a case of aligning a nut whose screw hole penetrates and has a predetermined fastening direction to a posture in which the axis line is vertically directed by the posture alignment device, there are cases where the nut placed on the nut mounting face does not match the posture directed to the predetermined fastening direction, since the insert pin can be inserted from either of the both end sides of the screw hole.

Therefore, in the present invention, the inversion mechanism and the fastening direction determining unit is provided, thereby enabling to align even a nut whose screw hole penetrates and having a predetermined fastening direction to a posture which matches the predetermined fastening direction. That is, first, it is determined whether or not the nut retained at the end portion of the advance-retreat member matches the predetermined fastening direction by the fastening direction determining unit. Then, when it is determined that the posture of the nut does not match the predetermined fastening direction by the fastening direction determining unit, the transfer control unit actuates the inversion mechanism to reverse the upside and downside of the nut retained by the nut retention mechanism. Accordingly, it is able to match the nut to the predetermined fastening direction and place it on the supply placing unit.

BRIEF DESCRIPTION OF THE DRAWINGS

FIG. 3A is an explanatory view illustrating an operation of main parts of the posture alignment device of the present embodiment, FIG. 3B is an explanatory view illustrating the operation of main parts of the posture alignment device of the present embodiment, and FIG. 3C is an explanatory view illustrating the operation of main parts of the posture alignment device of the present embodiment, and;

FIG. 5A is an explanatory view illustrating an operation of main parts of a transfer device of the present embodiment, and FIG. 5B is an explanatory view illustrating the operation of main parts of the transfer device of the present embodiment;

FIG. 8A is an explanatory view illustrating another operation of the transfer device, and FIG. 8B is an explanatory view illustrating another operation of the transfer device.

DESCRIPTION OF THE PREFERRED EMBODIMENTS

A nut feeding system according to an embodiment of the present invention is for feeding a nut for attaching tires to a tire attachment station where tires are attached to a vehicle body.

Figure 1:
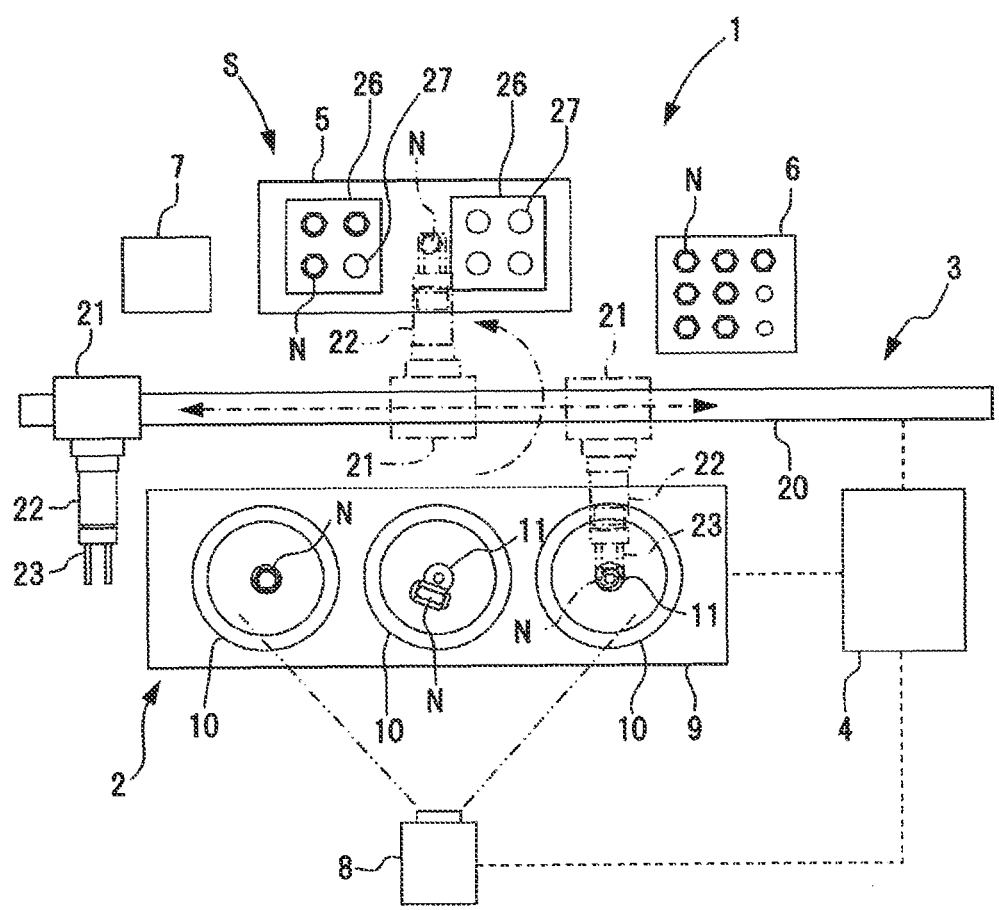
FIG. 1 is an explanatory plane view illustrating a nut feeding system according to an embodiment of the present invention.

As is shown in FIG. 1, the nut feeding system 1 comprises a posture alignment device 2, a transfer device 3, a controller 4, a supply placing unit 5, a storage placing unit 6, dissimilar nut eliminating unit 7, and a camera 8.

The posture alignment device 2 aligns a nut N to a predetermined posture. The transfer device 3 takes out the nut N from the posture alignment device 2 and transfers it. The controller 4 controls the posture alignment device 2 and the transfer device 3. The supply placing unit 5 is provided at a feeding position S of the nut N. The storage placing unit 6 temporarily stores a plurality of nuts N. The dissimilar nut eliminating unit 7 eliminates different types of nuts which are not used at the tire attachment station. The camera 8 is provided at a position facing the posture alignment device 2.

Figure 2:
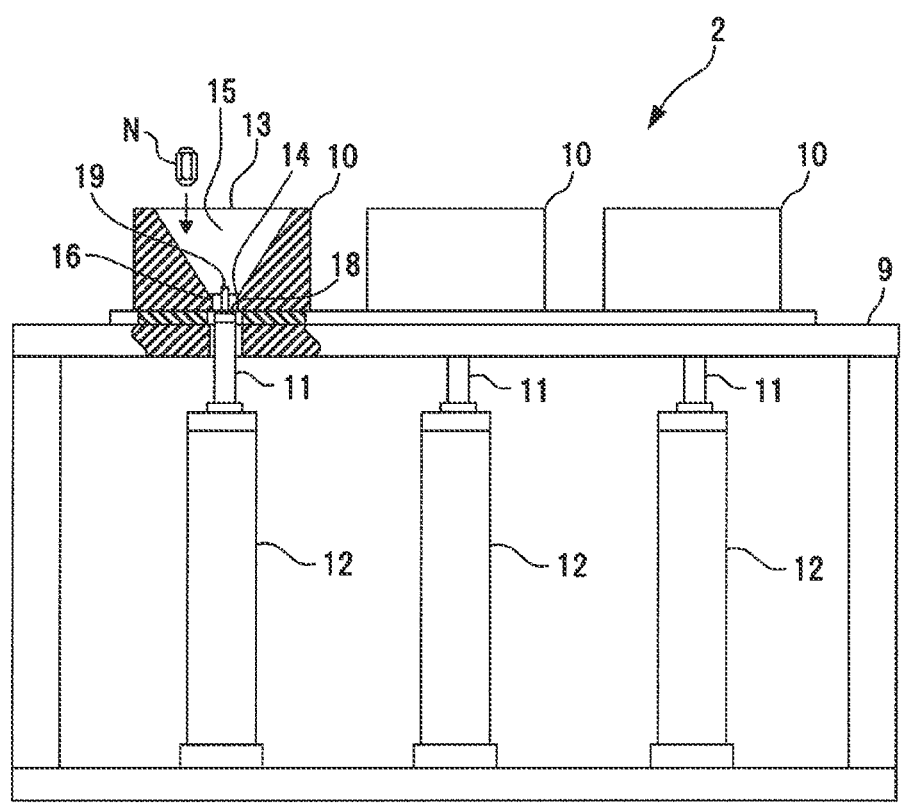
FIG. 2 is an explanatory side view partly cross sectional illustrating a posture alignment device of the present embodiment.

As is shown in FIG. 2, the posture alignment device 2 comprises a plurality of (three in the present embodiment) sliding container units 10, advance-retreat rods 11 (advance-retreat member), cylinders 12 (advance-retreat driving mechanism).

A plurality of the sliding container units 10 are arranged in parallel with a predetermined interval on an upper portion of a frame 9. The advance-retreat rods 11 penetrate a center portion of each sliding container unit 10 and are arranged to freely advance and retreat in the up-and-down direction. Cylinders 12 are arranged below each sliding container unit 10 and drive each advance-retreat rod 11 to advance and retreat.

Figure 4A:
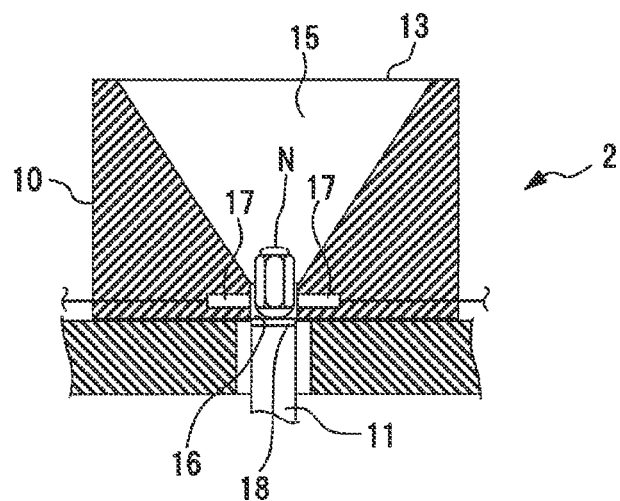
FIG. 4A is an explanatory view illustrating the operation of main parts of the posture alignment device following FIG. 3C.

As is shown in FIG. 3A, the sliding container unit 10 includes an inner circumferential face 15 formed in a funnel-shape which gradually reduces its diameter from an upper end opening 13 to a lower end opening 14. Moreover, the sliding container unit 10 includes a nut accommodating unit 16 extending downward from the lower end opening 14. In addition, as is shown in FIG. 4A, a nut detection sensor 17 is provided on the peripheral wall of the nut accommodating unit 16 for detecting the nut N in the nut accommodating unit 16 when the nut N is accommodated in the nut accommodating unit 16. A proximity sensor or an optical sensor or the like is adopted as the nut detection sensor 17, and is connected to the controller 4 (FIG. 1).

The advance-retreat rod 11 is formed as a longitudinal rod-shape in the vertical direction as is shown in FIG. 2 and FIG. 3A. At the upper end of the advance-retreat rod 11, a nut mounting face 18 for mounting the nut N is provided. Furthermore, an insert pin 19 is arranged to stand with its end directed upward at the center portion of the nut mounting face 18. The insert pin 19 is inserted in a screw hole h of the nut N as is shown in FIG. 5A. By this, the nut N is mounted on the nut mounting face 18 in a posture in which the axis line (a direction along the center of the screw hole h) of the nut is vertically directed (upward-downward direction).

As is shown in FIG. 1, the transfer device 3 includes a rail 20, a sliding member 21, and an arm 22. The rail 20 is extendedly provided along the alignment direction of the sliding container unit 10 of the posture alignment device 2. The sliding member 21 slides along the longitudinal direction of the rail 20. The arm 22 is provided at the sliding member 21. A nut clamper 23 (nut retention mechanism) for holding the nut is provided at the end of the arm 22.

Figure 4B:
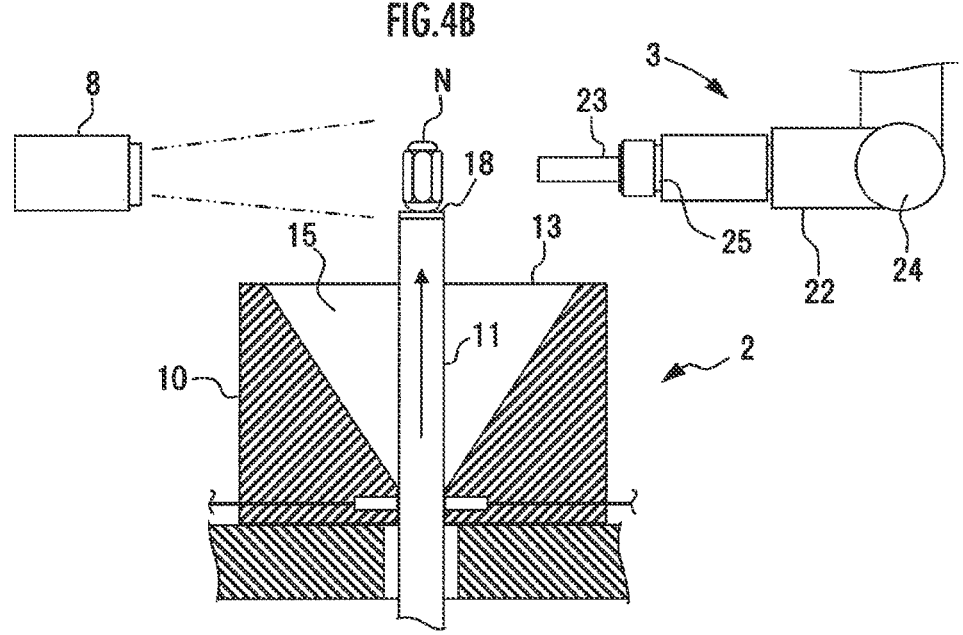
FIG. 4B is an explanatory view illustrating the operation of main parts of the posture alignment device following FIG. 4A.

As is shown in FIG. 4B, the arm 22 is configured to freely bend via a flexion axis 24. The nut clamper 23 is coupled to the end of the arm 22 via a rotation axis 25. This rotation axis 25 functions as the inversion mechanism of the present invention.

Figure 6:
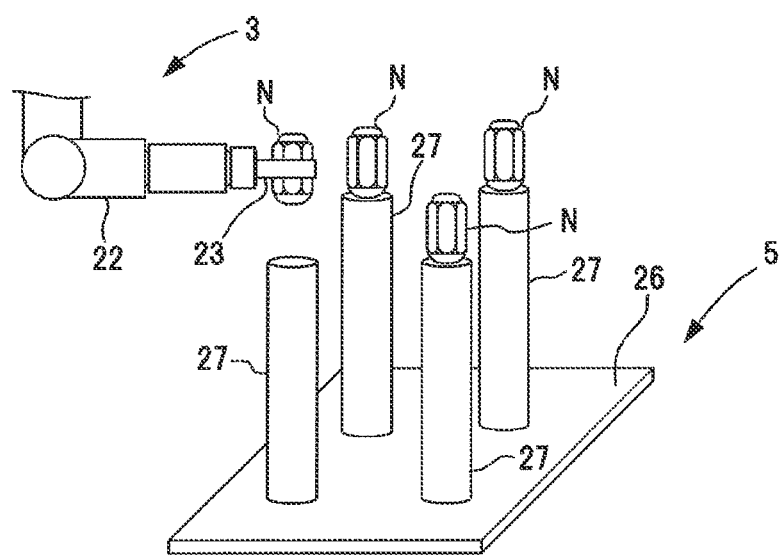
FIG. 6 is an explanatory view illustrating the operation of main parts of the transfer device following FIG. 5B.

As is shown in FIG. 1, the supply placing unit 5 includes two placing tables 26 for putting thereon a plurality of the nuts N (four in the present embodiment). As is shown in FIG. 6, four support columns 27 are vertically arranged on each placing table 26. At a top portion of each support column 27, a chuck mechanism not shown in the figures is provided which releasably fixes the nut N. By this, each support column 27 is able to place the nut N in a posture in which the axis line of the nut is vertically directed at the top portion.

Here, although each of the four nuts N are supported by each of the placing table 26 in the present embodiment, the number of nuts N supported by each placing table 26 corresponds to the number of hub bolts provided at the tire attachment portion of the vehicle body not shown in the figures. Accordingly, in a case where the number of hub bolts provided at the tire attachment portion of the vehicle body not shown in the figures is five, a placing table including five support columns 27 is provided.

As is shown in FIG. 1, the storage placing unit 6 is arranged to retain a plurality of the nuts N in a plurality of lines. Furthermore, although not shown in the figures in details, each nut N on the storage placing unit 6 is placed in a posture in which the axis line thereof is vertically directed.

Here, explanation regarding the nut N is given referring to FIG. 5A. The nut N is a so called hexagon cap nut whose one end of the screw hole h is opened and the other end of the screw hole h is blocked. This type of nut N screws the screw hole h to the bolt from the opened side. Therefore, since the insert pin 19 at the tip end of the advance-retreat rod 11 is inserted in the screw hole h along the fastening direction of the nut N, the nut N is inevitably in a posture in which the fastening direction is directed downward, when the nut N is mounted on the nut mounting face 18.

Next, the operation of the nut feeding system 1 according to the above mentioned configuration is explained. First, the nut N is loaded by a loading device not shown in the figures to each of the three sliding container units 10 shown in FIG. 1. As is shown in FIG. 3A, the nut N loaded from the upper end opening 13 of the sliding container unit 10 slides down the inner circumferential face 15 of the sliding container unit 10 by its self weight. At this time, the controller 4 functions as the alignment control unit of the present invention, and controls the cylinder 12 of the posture alignment device 2, and repeats the advance and retreat (reciprocating motion in the up-and-down direction) of the advance-retreat rod 11 at a predetermined speed.

By this, as is shown in FIG. 3B and FIG. 3C, the nut N constantly changes its posture by the repetition of upthrust and dropping by the advance-retreat rod 11 inside the sliding container unit 10. Then, as is shown in FIG. 3C, the insert pin 19 inserts into the screw hole h when the nut N becomes a posture in which the fastening direction is directed downward.

When the insert pin 19 inserts into the screw hole h of the nut N and the advance-retreat rod 11 descents to the lowermost position in a state the nut N is mounted on the nut mounting face 18, the nut N is accommodated in the nut accommodating unit 16 as is shown in FIG. 4A. At this time, the nut N is in a posture in which the axis line thereof is vertically directed and the fastening direction is directed downward.

When the nut N is accommodated in the nut accommodating unit 16, the nut detection sensor 17 detects the nut N. Then, the controller 4 receives a detection signal from the nut detection sensor 17, and elongates the advance-retreat rod 11 by driving the cylinder 12, and then raises the nut N on the nut mounting face 18 higher than the upper end opening 13 of the sliding container unit 10 as is shown in FIG. 4B.

As described above, the nut N is aligned to a posture in which the axis line thereof is vertically directed. Here, the posture alignment device 2 is able to align the nut N to the above posture efficiently at each sliding container unit 10 by having three sliding container units 10 and advance-retreat rods 11.

Meanwhile, the nut N risen by the advance-retreat rod 11 is captured by the camera 8 and its image data is sent to the controller 4. The controller 4 determines the right or wrong of the shape, posture and type of the nut N based on the image data.

Next, the controller 4 functions as the transfer control unit of the present invention and controls the transfer device 3 according to the determination result based on the image data. That is, the nut N positioned upward of the sliding container unit 10 by the advance-retreat rod 11 in a state mounted on the nut mounting face 18 with the insert pin 19 inserted in the screw hole h as is shown in FIG. 5A, is held by the nut clamper 23, and detached from the advance-retreat rod 11 as is shown in FIG. 5B. Subsequently, the controller 4 transfers the nut N on to the placing table 26 of the supply placing unit 5 by the arm 22, and places the nut N on the support column 27 as is shown in FIG. 6. At this time, the nut N is placed on the support column 27 maintaining the state aligned to the posture in which the axis line is vertically directed and the fastening direction is directed downward by the posture alignment device 2.

Then, when the nut N is placed on the four support columns 77 the nut N is taken out from the support columns 27 by a socket of a nut runner comprised by a robot or the like provided at the tire attachment station not shown in the figures, and the tire attachment operation is conducted.

Here, just in a case where it is likely that the alignment of the nut N in the posture alignment device 2 would late for taking the nut N from the supply placing unit 5 at the tire attachment station, the controller 4 controls the transfer device 3 to transfer the nut N from the storage placing unit 6 to the supply placing unit 5. By this, the tire attachment operation at the tire attachment station can be performed without delay.

Moreover, in a case where the nut raised to the upper side of the sliding container unit 10 by the advance-retreat rod 11 is determined to be a different type of nut according to the image data, the controller 4 controls the transfer device 3 to transfer the different type of nut to the dissimilar nut eliminating unit 7 (FIG. 1) thereby eliminating it.

Figure 7A:
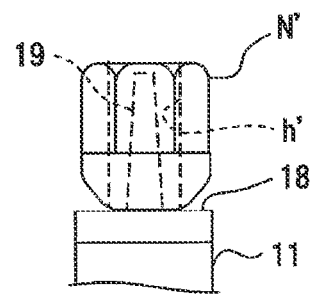
FIG. 7A is an explanatory view illustrating a posture of a nut on an advance-retreat member.

Feeding operations of the nut N formed such that one end of the screw hole h is opened and the other end of the screw hole h is blocked (hexagon cap nut) has been described in the above explanations. However, as is shown in FIG. 7A, there are cases where other types of nut N' whose screw hole h' penetrates in the axis direction which is different from the hexagon cap nut is supplied at the tire attachment station. Here, the other type of nut N' has a different outer shape between the tip end side and the back end side of the fastening direction.

Next, in a case of feeding the other type of nut N' is explained. The operation of the posture alignment device 2 is as same as the aforementioned nut N (hexagon cap nut). Here, it is preferable that the other type of nut N' is supported by the advance-retreat rod 11 correctly aligned in a posture in which the fastening direction is directed downward as is shown in FIG. 7A. However, since the screw hole h' penetrates in the axis direction, there are cases where the nut N' is supported by the advance-retreat rod 11 in an incorrect posture in which the fastening direction is directed upward as is shown in FIG. 7B.

Therefore, the controller 4 functions as the fastening direction determining unit of the present invention. More specifically, the other type of nut N' positioned upward of the sliding container unit 10 by the advance-retreat rod 11 in a state mounted on the nut mounting face 18 is captured by the camera 8. The captured image data is sent to the controller 4. The controller 4 determines whether or not the nut N' is in a posture in which the fastening direction is directed downward from the shape of the other type of nut N' indicated by the image data at this time.

Here, in a case it is determined that the posture of the other type of nut N' is the correct posture as is shown in FIG. 7A, the controller 4 controls the transfer device 3 to transfer the other type of nut N' to the supply placing unit 5 from the posture alignment device 2 similar to the aforementioned nut N (hexagon cap nut).

Figure 7B:
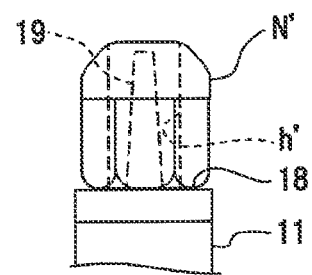
FIG. 7B is an explanatory view illustrating the posture of the nut on the advance-retreat member.

Moreover, in a case it is determined that the posture of the other type of nut N' is the incorrect posture as is shown in FIG. 7B, the controller 4 controls the transfer device 3 as below. That is, the other type of nut N' is held by the nut clamper 23 and disengaged from the advance-retreat rod 11 as is shown in FIG. 8A. Subsequently, the nut clamper 23 is turned 180-degree via the rotation axis 25 as is shown in FIG. 8B. By this, the upside and the downside of the other type of nut N' is inversed, and translated to the correct posture in a state held by the nut clamper 23. After this, the controller 4 controls the transfer device 3 to place and feed the other type of nut N' to the supply placing unit 5 similar to the aforementioned nut N (hexagon cap unit).

As such, the nut feeding system 1 of the present embodiment is able to feed not only the nut N (hexagon cap nut) having a shape of one end of the screw hole h being opened and the other end of the screw hole h being blocked but also other types of nut N' whose screw hole h' penetrates in the axis direction, to the tire attachment station aligned to a posture in which their axes lines are vertically directed and the fastening direction directed downward.

Figure 9A:
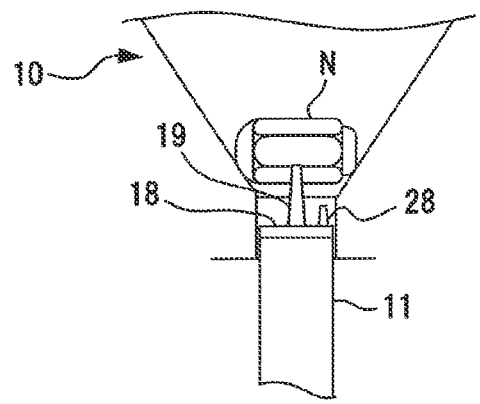
FIG. 9A is an explanatory view illustrating a protrusion on a nut mounting face.

Furthermore, for example, as is shown in FIG. 9A, there are cases where the nut N is in a posture fallen with its axis line directed horizontally at the lower end position of the sliding container unit 10. In such case, even by advancing and retreating the advance-retreat rod 11, the nut N only rotates around its axis line and the change of posture is not smoothly performed, and it is likely that the number of times of the advance and retreat motion of the advance-retreat rod 11 increases thereby decreasing efficiency.

Figure 9B:
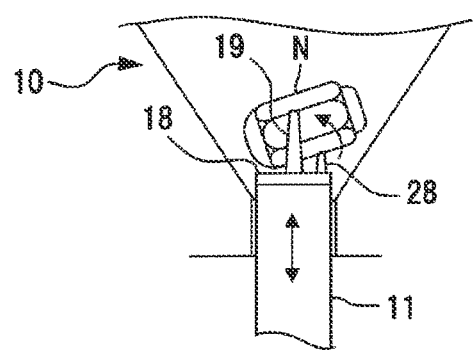
FIG. 9B is an explanatory view illustrating the protrusion on the nut mounting face.
Figure 9C:
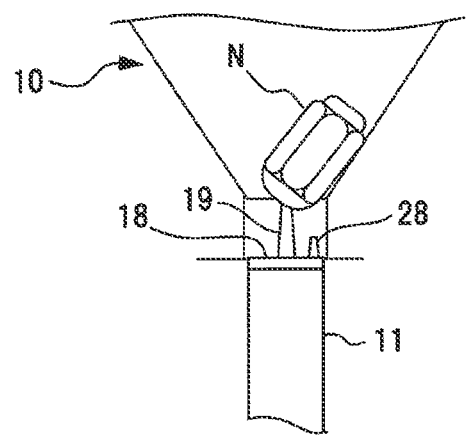
FIG. 9C is an explanatory view illustrating the protrusion on the nut mounting face.

In this regard, it is proposed to provide a protrusion 28 on the nut mounting face 18 of the advance-retreat rod 11. This protrusion 28 is provided at a position spaced from the insert pin 19 and is formed to have a smaller height dimension than the insert pin 19. By this, the protrusion 28 contacts a part of the nut N along with the advance and retreat motion of the advance-retreat rod 11 as is shown in FIG. 9B, and enables to surely change the posture of the nut N as is shown in FIG. 9C. The nut N whose posture has been changed by the protrusion 28, is in a state easy for alignment to a posture in which the axis line thereof is vertically directed. Therefore, the number of times of the advance and retreat motion of the advance-retreat rod 11 can be reduced, thereby improving efficiency.

EXPLANATIONS OF REFERENCE SIGNS

N, N' . . . nut,
1 . . . nut feeding system,
2 . . . posture alignment device,
3 . . . transfer device,
4 . . . controller (alignment control unit, transfer control unit, fastening direction determining unit),
5 . . . supply placing unit,
6 . . . storage placing unit,
10 . . . sliding container unit,
11 . . . advance-retreat rod (advance-retreat member),
12 . . . cylinder (advance-retreat driving mechanism),
17 . . . nut detection sensor,
18 . . . nut mounting face,
19 . . . insert pin,
23 . . . nut clamper (nut retention mechanism),
25 . . . rotation axis (inversion mechanism),
28 . . . protrusion

What is claimed is:
1. A nut feeding system for feeding a nut to a predetermined feeding position comprising:
   a posture alignment device configured to align the loaded nut to a posture in which an axis line of the nut is vertically directed;
   a supply placing unit provided at the feeding position and configured to place thereon the nut in a posture in which the axis line of the nut is vertically directed; and
   a transfer device configured to transfer the nut aligned to the posture by the posture alignment device towards the supply placing unit,
   wherein the posture alignment device comprises;

a sliding container unit having an inner circumferential face gradually decreasing a diameter from an upper end opening towards a lower end opening, in which the nut loaded from the upper end opening slidingly drops to the lower end opening, a rod shaped advance-retreat member extending vertically and provided so as to freely advance and retreat from the lower end opening towards the upper end opening of the sliding container unit, an advance-retreat driving mechanism configured to drive the advance and retreat of the advance-retreat member, a nut mounting face formed at an upper end of the advance-retreat member and configured to be able to mount one end in the axial line direction of the nut, an insert pin arranged to stand on the nut mounting face and configured to insert in a screw hole of the nut on the nut mounting face and to maintain the mounting state of the nut in the posture in which the axis line of the nut is vertically directed on the nut mounting face, a nut detection sensor configured to detect the nut mounted on the nut mounting face with the insert pin inserted in the screw hole, and an alignment control unit configured to repeat the advance and retreat motion of the advance-retreat member by the advance-retreat driving mechanism until the nut detection sensor detects the nut, and to raise the nut on the nut mounting face higher than the upper end opening of the sliding container unit via the advance-retreat member by the advance-retreat driving mechanism when the nut detection sensor detects the nut, and wherein the transfer device comprises;

a nut retention mechanism configured to releasably retain the nut, and a transfer control unit configured to retain the nut on the nut mounting face by the nut retention mechanism, and to release the nut from the insert pin to transfer, when the nut is raised higher than the upper end opening of the sliding container unit by the advance-retreat member of the posture alignment device.

2. The nut feeding system according to claim 1, wherein the posture alignment device comprises a protrusion having a smaller height dimension than the insert pin at a position spaced from the insert pin on the nut mounting face.

3. The nut feeding system according to claim 1, comprising a storage placing unit at a position different from the supply placing unit, configured to store a plurality of nuts placed in a posture in which the axes lines of the nuts are vertically directed, wherein the transfer device is configured to selectively retain by the nut retention mechanism and transfer toward the supply placing unit either one of the nut on the nut mounting face of the posture alignment device and the nut placed on the storage placing unit.

4. The nut feeding system according to claim 1, wherein the transfer device comprises an inversion mechanism configured to reverse an upside and downside of the nut via the nut retention mechanism in a case of transferring the nut in a posture in which the axis line of the nut is vertically directed, and a fastening direction determining unit configured to determine whether or not the posture of the nut in which the axis line of the nut being vertically directed matches a predetermined fastening direction of the nut by detecting a shape of the nut raised higher than the upper end opening of the sliding container unit by the advance-retreat member, wherein the transfer control unit reverses the upside and the downside of the nut by the inversion mechanism when it is determined that the posture of the nut does not match the fastening direction by the fastening direction determining unit.

* * * * *